United States Patent
Liu

(10) Patent No.: US 6,732,768 B2
(45) Date of Patent: May 11, 2004

(54) METHOD FOR MANUFACTURING CAR WAX SPRAY

(76) Inventor: Hung-Yang Liu, P.O. Box 7-820, Taipei (TW)

(*) Notice: Subject to any disclaimer, the term of this patent is extended or adjusted under 35 U.S.C. 154(b) by 0 days.

(21) Appl. No.: 10/270,439

(22) Filed: Oct. 15, 2002

(65) Prior Publication Data

US 2004/0069365 A1 Apr. 15, 2004

(51) Int. Cl.[7] .............................. B65B 31/00; B67C 3/00
(52) U.S. Cl. ...................... 141/5; 141/3; 141/9; 141/20; 141/100
(58) Field of Search .............................. 141/1–5, 9, 18, 141/20, 21, 85, 100, 113

(56) References Cited

U.S. PATENT DOCUMENTS 4,001,391 A * 1/1977 Feinstone et al. ............. 424/45
6,581,807 B1 * 6/2003 Mekata ..................... 222/402.1
2002/0122811 A1 * 9/2002 Stein et al. .................. 424/401

* cited by examiner

*Primary Examiner*—Timothy L. Maust

(57) ABSTRACT

A method of manufacturing a car wax spray, particularly to the one stored in the decomposed liquid state in a storage bottle that will turn into solid state after being sprayed out from the storage bottle. The present invention comprises the steps of filling 55% of the solid wax into the bottom of a storage bottle, and then 35% of the soluble gaseous propane to dissolve and decompose the solid wax into a concentrated liquid state, and then filling 10% of the volatile butane into the storage bottle to dilute the concentrated wax liquid by the movement of two steel beads into a diluted ready liquid, such that when the air pressure sprays out the wax, the butane is oxidized by the air and is vaporized instantly, and the even film remaining after the spray will resume its original solid state.

2 Claims, 3 Drawing Sheets

METHOD FOR MANUFACTURING CAR WAX SPRAY

BACKGROUND OF THE INVENTION

1. Field of the Invention

The present invention relates to a method of manufacturing car wax spray, more particularly to a method of manufacturing a car wax spray which is stored in the state of decomposed liquid in a storage bottle and will turn into the solid state after being sprayed out from the storage bottle.

2. Description of the Prior Art

Transportation is a basic living tool for people in e-times, and almost every family has a car. Besides the convenience brought by use of a motor vehicle, maintenance is also unavoidable. Protecting the car body from wind and rain is one of the key elements. After a motor vehicle has been used for some time, the car body becomes dirty due to the dusty wind and the sun. Under these circumstances, the car is either washed by oneself or sent to a cleaner. Car wash and waxing are needed to prevent rusting and maintaining the artistic look. The present car wax process generally includes the steps of plastering the sponge with solid wax and then waxing the car body. The wax is generally not evenly spread, and thus a lot of wax is wasted. Furthermore, the hard-to-reach area may get rusted easily, and the car body requires rework or replacement even under normal use of the car. The car waxing according to the present invention intends to improve the traditional waxing and the waxing quality may be enhanced as a result.

SUMMARY OF THE INVENTION

The primary objective of the present invention is to provide a method of manufacturing car wax spray, particularly for those stored in the state of decomposed liquid in a storage bottle and will turn into the solid state after being sprayed out from the storage bottle.

The secondary objective of the present invention is to provide a method of manufacturing car wax spray by filling 55% of the solid wax into the bottom of a storage bottle, and then 35% of the soluble gaseous propane to dissolve and decompose the solid wax into a concentrated liquid state.

Another objective of the present invention is to provide a method of manufacturing car wax spray by filling 10% of the volatile butane into the storage bottle to dilute the concentrated wax liquid by the movement of two steel beads into a dilute ready liquid, such that when the air pressure sprays out the wax, the butane is oxidized by the air and is vaporized instantly, and the even film remained after the spray will resume its original solid state.

A further objective of the present invention is to provide a method of manufacturing car wax spray, particularly for those liquid wax used for evenly spraying on the surface of the car to prevent rusting without a waste of wax, which are the improvements of economy and effect over the traditional car wax by wiping.

DETAILED DESCRIPTION OF THE PREFERRED EMBODIMENT

Figure 1:
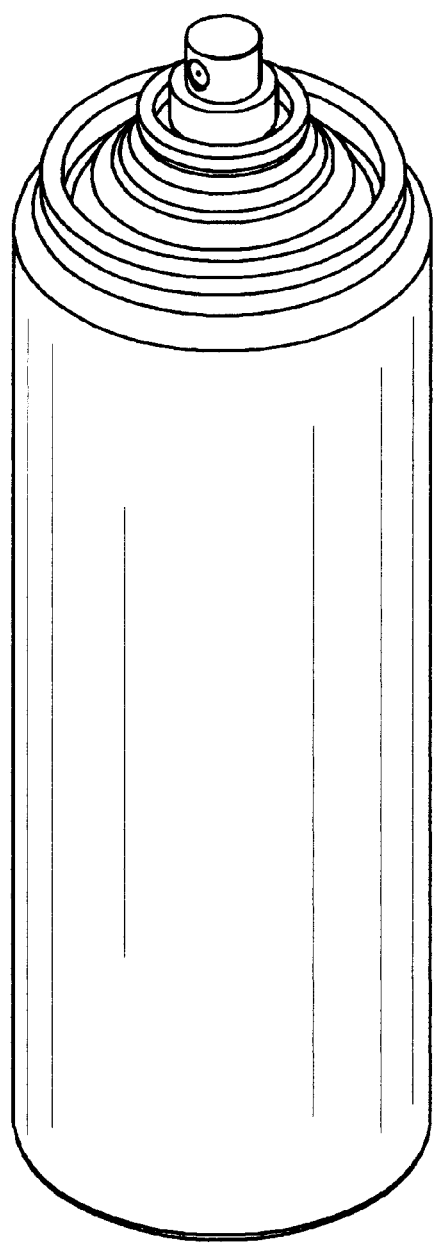
FIG. 1 shows a storage bottle for storing the decomposed liquid wax according to the present invention.
Figure 2:
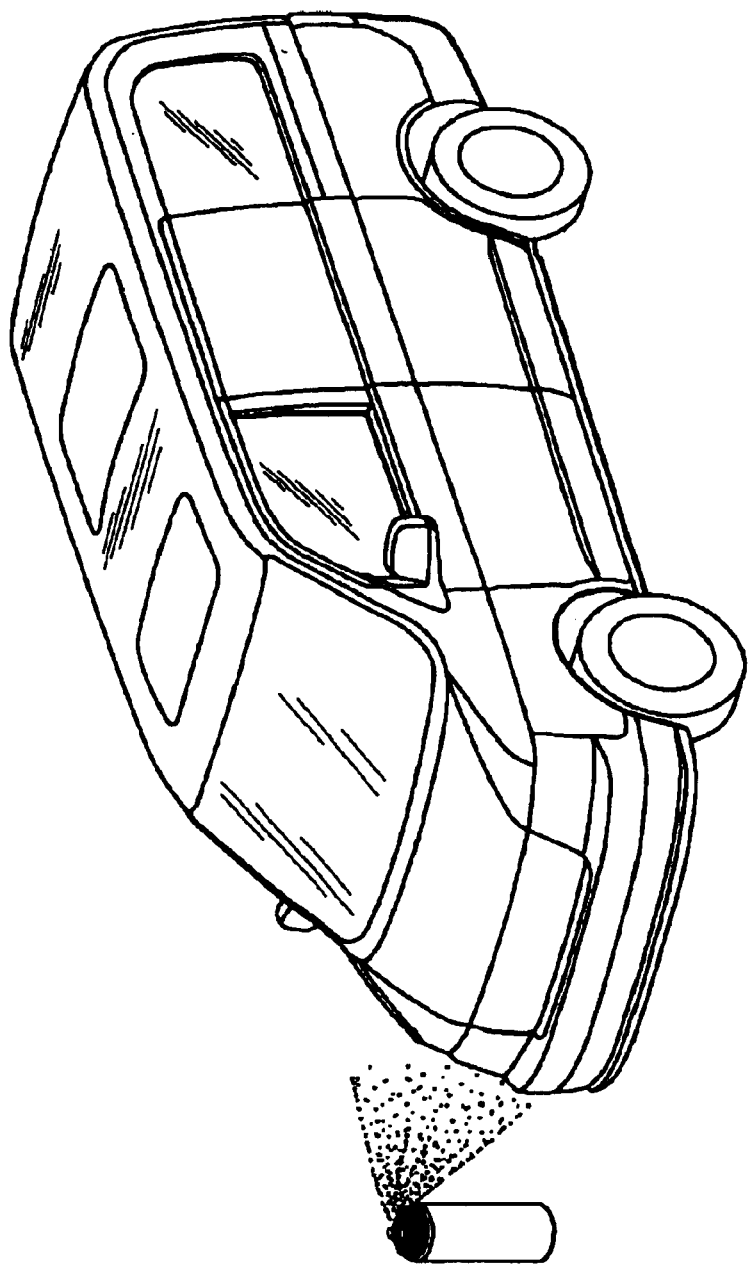
FIG. 2 shows the liquid wax being sprayed out and oxidized and vaporized in the air and remained on the surface returns to the solid state according to the present invention.
Figure 3:
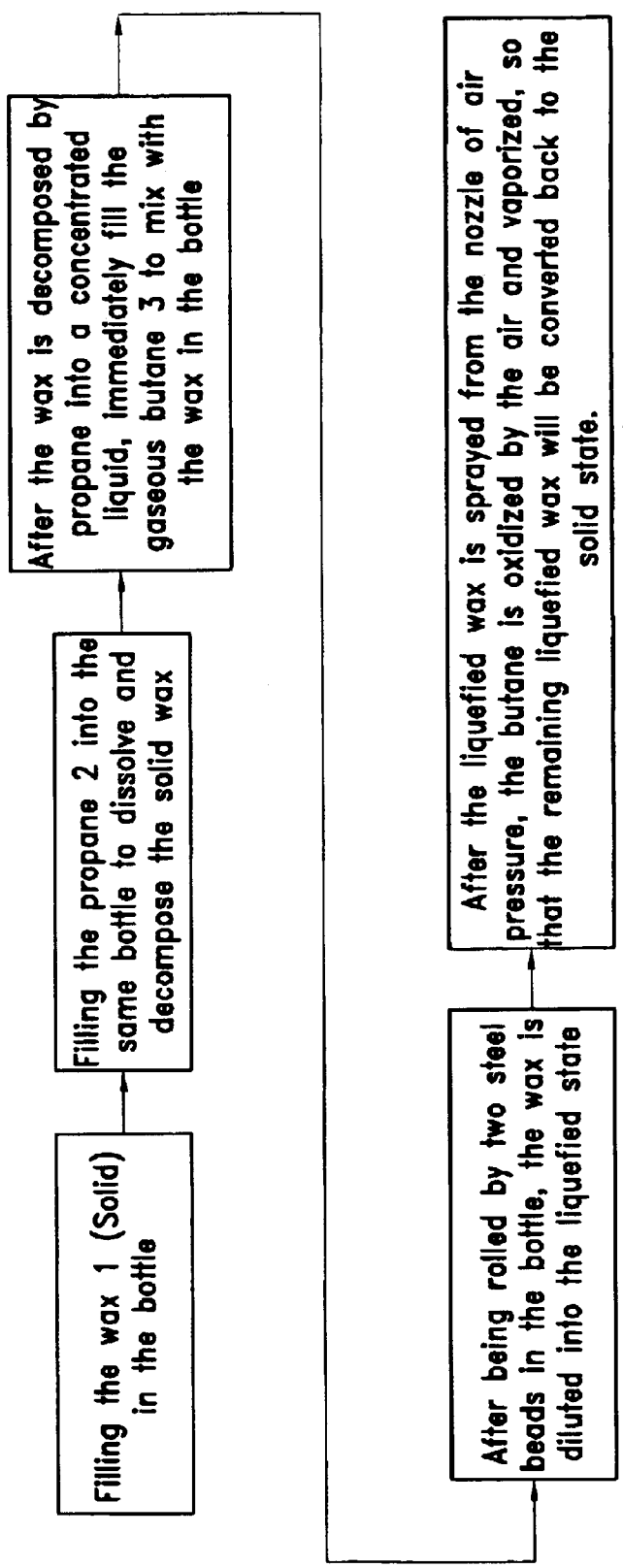
FIG. 3 is a block diagram of the process for manufacturing the car wax spray according to the present invention.

Please refer to FIGS. 1 to 3 for the method of manufacturing car wax spray according to the present invention. To accomplish the objective of the foregoing manufacturing, the main composition should include special materials such as solid wax 1, propane 2, and butane 3, and the manufacturing process comprises the steps of filling the solid wax into a storage bottle and then the propane for decomposition, and then the volatile gaseous butane to dissolve the wax, and their mixing proportion should meet the following conditions: 55% for solid wax, 35% for gaseous propane, and 10% for gaseous butane. The process of manufacturing the car wax according to the present invention follows the sequence given below: Filling the wax in the storage bottle, filling the propane into the storage bottle to dissolve and decompose the wax, and filling the butane into the storage bottle to dissolve and mix the wax.

The sequence of the manufacturing process of the present invention includes the steps of filling the solid wax into the bottom of a storage bottle; filling the decomposed gaseous propane into the storage bottle to dissolve and mix the wax and then forming a dilute decomposed liquid after the gaseous propane is filled; filling the volatile butane into the storage bottle immediately after the wax is liquefied and dissolved to form a mixture of liquid inside the bottle. When the two steel beads staying in the storage bottle are rolling, the dilute liquefied wax is converted into a ready-to-use liquefied wax for spraying, and the sprayed wax film remaining on the surface is converted into the solid state again.

The solid wax makes use of the space in the storage bottle and is decomposed from solid state to liquid state by means of the propane and butane for pressurized spray. Since it instantly comes into contact with the atmosphere to fully vaporize the gas, and converts the wax from liquid state into solid state again. The present invention completely overcomes the shortcoming of wasting large quantity of wax by staining the sponge according to the traditional waxing and can save 80% of the storage wax as well as breaks through the bottleneck of the energy-saving.

While the invention has been described by means of specific embodiments, numerous modifications and variations could be made thereto by those skilled in the art without departing from the scope and spirit of the invention set forth in the claims.

What is claimed is:

1. A method of manufacturing car wax spray, including the composition of a solid wax, a decomposed gaseous propane, and a gaseous butane, comprising the steps of:

filling the original solid wax into the bottom of a storage bottle;

filling the decomposed gaseous propane to dissolve and decompose the solid wax into a diluted liquid state;

filling the volatile butane into the storage bottle immediately after the wax is dissolved to form a mixture of liquid inside the bottle; and then by the movement of two steel beads into the diluted liquid, it is converted into a ready-to-use liquified wax for spraying, such that the sprayed-out butane with wax is oxidized by the atmosphere and vaporized instantly and an even film remaining after the spray resumes its original solid state.

2. A method of manufacturing car wax spray as claimed in claim 1, wherein said solid wax occupying 55%, said propane 35%, and said volatile gaseous butane 10% of the entire composition.

* * * * *